(12) United States Patent
Edwards et al.

(10) Patent No.: US 11,593,810 B2
(45) Date of Patent: Feb. 28, 2023

(54) SYSTEMS AND METHODS FOR TRANSACTION PRE-REGISTRATION

(71) Applicant: Mastercard International Incorporated, Purchase, NY (US)

(72) Inventors: David Scott Edwards, Fenton, MO (US); Jeremy Glennon Benear, Wentzville, MO (US)

(73) Assignee: Mastercard International Incorporated, Purchase, NY (US)

( * ) Notice: Subject to any disclaimer, the term of this patent is extended or adjusted under 35 U.S.C. 154(b) by 361 days.

(21) Appl. No.: 16/198,265

(22) Filed: Nov. 21, 2018

(65) Prior Publication Data
US 2020/0160343 A1    May 21, 2020

(51) Int. Cl.
G06Q 20/40    (2012.01)

(52) U.S. Cl.
CPC ....... *G06Q 20/4016* (2013.01); *G06Q 20/409* (2013.01)

(58) Field of Classification Search
CPC ................................................. G06Q 20/4016
See application file for complete search history.

(56) References Cited

U.S. PATENT DOCUMENTS

| | | | |
|---|---|---|---|
| 5,064,999 A * | 11/1991 | Okamoto | |
| 6,457,046 B1 * | 9/2002 | Munakata | H04L 29/06 709/216 |
| 9,741,026 B1 * | 8/2017 | Grassadonia | |
| 2009/0283591 A1 * | 7/2009 | Silbernagl | |
| 2011/0276418 A1 * | 11/2011 | Velani | G06Q 20/3276 705/16 |
| 2011/0295973 A1 * | 12/2011 | Haba | G06F 16/95 709/217 |
| 2012/0226582 A1 * | 9/2012 | Hammad | H04L 9/3234 705/26.41 |
| 2012/0309351 A1 * | 12/2012 | Dutta | H04W 4/00 |
| 2013/0282580 A1 * | 10/2013 | O'Brien | G06Q 20/065 705/44 |
| 2015/0193632 A1 * | 7/2015 | Golac | G06F 21/10 726/1 |
| 2015/0319161 A1 * | 11/2015 | Dimmick | H04W 12/06 |
| 2017/0005982 A1 * | 1/2017 | Gould | |
| 2017/0053282 A1 * | 2/2017 | Olumofin | G06Q 20/4016 |
| 2017/0124548 A1 * | 5/2017 | Bolla | G06Q 20/32 |
| 2018/0336194 A1 * | 11/2018 | Thuppanna | |
| 2019/0147155 A1 * | 5/2019 | Di Luzio | G06F 21/31 713/186 |

OTHER PUBLICATIONS

Kennao, et al., in "GPS Mobile Banking: An Advance Security Measures," from International Journal of Development Research, vol. 6(4) (Year: 2016).*

* cited by examiner

*Primary Examiner* — Olabode Akintola
*Assistant Examiner* — Brandon M Duck
(74) *Attorney, Agent, or Firm* — Hovey Williams LLP

(57) ABSTRACT

A computer-implemented method includes the operations of receiving pre-registration data from a cardholder and receiving cardholder transaction data from an interchange network. Transaction details are extracted from the received cardholder transaction data. The extracted transaction details are compared to the received pre-registration data, and based on the comparison, a transaction confidence score for the transaction is determined.

20 Claims, 9 Drawing Sheets

SYSTEMS AND METHODS FOR TRANSACTION PRE-REGISTRATION

FIELD OF THE DISCLOSURE

The field of the disclosure relates generally to electronic financial transactions and, more particularly, to systems and methods for pre-registering electronic financial transactions to facilitate reducing falsely declined transactions.

BACKGROUND OF THE DISCLOSURE

A typical payment card customer performs transactions in several ways with varying purchase amounts and number of transactions in a given period. The purchase amounts and number of transactions may vary greatly, but generally are predictable to the payment card issuer after the consumer has generated some appreciable transaction history. The issuer owns the transaction approval or decline decision and therefore, would like to decline fraudulent transactions without impacting the consumer's transaction experience. Accordingly, issuers have varying degrees of fraud detection systems and algorithms that facilitate determining if a transaction is legitimate and should be approved. Each payment card issuer, however, is different, so consumer experiences are likewise different.

In some known payment card systems, consumer transactions are declined inadvertently because the transaction was flagged by a computer program as likely fraudulent, although the transaction was a legitimate transaction performed by the consumer. As a result of being declined, the consumer may feel embarrassed during the purchase/checkout transaction. In some instances, the consumer may just try another payment card, thereby driving business away from the primary issuer or may abandon the purchase altogether causing a loss of revenue to the issuer.

In addition, falsely declining a transaction leads to increased issuer call center volume when consumers attempt to find out why a transaction was declined. This typically happens, however, after the declined transaction opportunity has passed. Some examples of transaction where false declines increasingly occur include large one-time purchases, multiple purchases in a short timeframe (particularly at a single merchant), and purchases made in different geographies in a short period. Since known fraud detection systems are reactive, these false declines are problematic to reduce and extremely difficult to eliminate.

BRIEF DESCRIPTION OF THE DISCLOSURE

This summary is not intended to identify essential features of the present invention and is not intended to be used to limit the scope of the claims. These and other aspects of the present invention are described below in greater detail.

In one aspect, a computer-implemented method for scoring a transaction is provided. The method includes the operations of receiving pre-registration data from a cardholder and receiving cardholder transaction data from an interchange network. The method also includes extracting transaction details from the received cardholder transaction data. Moreover, the method includes comparing the extracted transaction details to the received pre-registration data. In addition, the method includes determining a transaction confidence score for the transaction based on the comparison.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

Figure 1:
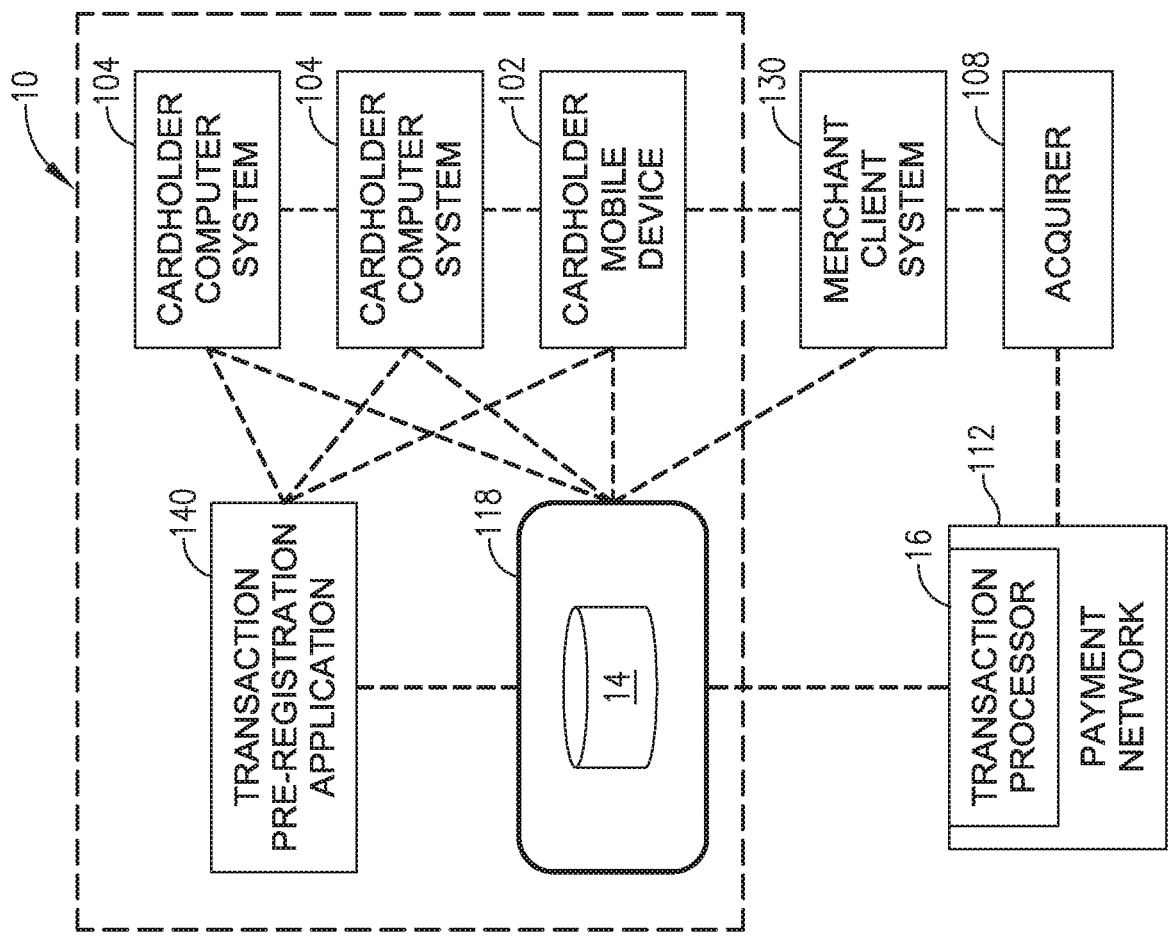
FIG. 1 is a block diagram of a transaction pre-registration service system including a transaction pre-registration service server, in accordance with one embodiment of the present disclosure.

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. It is contemplated that the invention has general application to identifying and verifying entities requesting access to confidential information and/or financial services. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

Broadly characterized, the present disclosure relates to systems and methods to facilitate cardholder purchases and prevent false declines. A cardholder opts-in to a payment network transaction pre-registration service where the cardholder provides data relating to anticipated transactions that may be atypical for the cardholder and/or provides data relating to the cardholder's travel intentions. The payment network applies a transaction confidence score to each transaction of the participating cardholder. The transaction confidence score is passed to the issuer of the payment card via the transaction authorization message. The issuer still owns the decision to approve or decline the transaction, but will have an additional, proactive fraud score that may be leveraged to make a more informed decision. More particularly, the cardholder leverages a mobile application to provide cardholder authentication to enter a pending transaction or transactions. The cardholder enrollment process is secure and authenticates the cardholder. Once the cardholder is enrolled in the service and prior to an atypical transaction, the cardholder authenticates to the service via the mobile application or via an online website. The cardholder chooses a type of transaction entry, including, for example, a large transaction, frequent transactions, geographic allowance, etc. along with a time/date range. The payment network stores the details and compares transactions from the cardholder to the stored details before the transaction authorization requests reach the issuer. With the extra assurance that an authenticated cardholder pre-defined an atypical transaction, the issuer has more confidence the transaction is legitimate and should not be declined.

FIG. 1 is a block diagram of a transaction pre-registration service system 10 including a transaction pre-registration service server 118. The transaction pre-registration service server 118 includes at least one processor (not shown) in communication with a database 14. The database 14 contains information on a variety of matters, including, for example, stored transaction pre-registration data for one or more users, travel intention data to identify places and dates of travel for one or more users, one or more user profiles, and other information described herein. In one embodiment, the database 14 is stored on the transaction pre-registration service server 118. In an alternative embodiment, the database 14 is stored remotely from the transaction pre-registration service server 118 and may be non-centralized. In the example embodiment, the transaction pre-registration service system 10 is in communication with a transaction processor 16, which is integral to and/or associated with a payment or interchange network 112. The interchange network 112 is described more fully herein with respect to FIG. 2.

In the example embodiment, the transaction pre-registration service system 10 further includes a plurality of client systems or subsystems 130, cardholder mobile devices 102, and/or cardholder computer systems 104. In one embodiment, the cardholder mobile devices 102 and cardholder computer systems 104 are computers including a web browser or application, such that the transaction pre-registration service server 118 is accessible to the cardholder mobile devices 102 and the cardholder computer systems 104 using the Internet. The cardholder mobile devices 102 and the cardholder computer systems 104 are interconnected to the Internet through many interfaces including a network, such as a local area network (LAN) and/or a wide area network (WAN), dial-in connections, cable modems, wireless-connections, and special high-speed ISDN lines. The cardholder mobile devices 102 and the cardholder computer systems 104 may be any device capable of interconnecting to the Internet including mobile computing devices, such as a laptop or desktop computer, a web-based phone (e.g., a "smart phone"), a personal digital assistant (PDA), a tablet or phablet, a web-connectable appliance, a "smart watch" or other wearable device, or other web-connectable equipment. It should be understood that the transaction pre-registration service system 10 may include any number of cardholder computer systems 104 and cardholder mobile devices 102.

Figure 2:
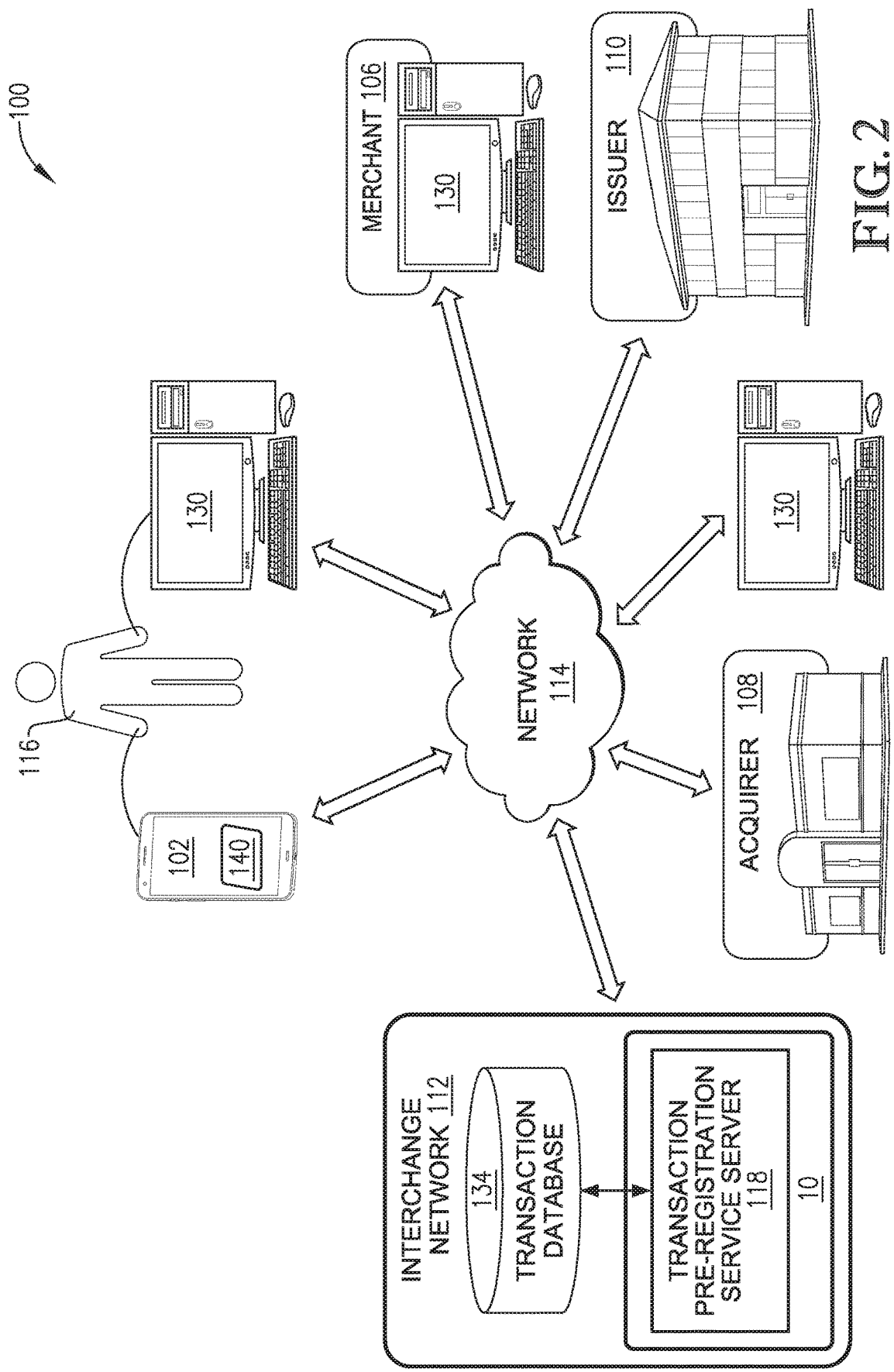
FIG. 2 is a simplified block diagram of an exemplary payment card network system including the transaction pre-registration service server shown in FIG. 1.

Transaction pre-registration service server 118 is configured to communicate with a cardholder mobile device 102 and/or a cardholder computer system 104 associated with a cardholder 116 (shown in FIG. 2). The cardholder mobile device 102 and/or cardholder computer system 104 is configured to execute for display on a transaction pre-registration service application 140. In some embodiments, the transaction pre-registration service application 140 may be stored in a cloud-based interface, which may include cloud storage capability as well as any cloud-based API that facilitates communication between a merchant client system 130 and the transaction pre-registration service server 118 and/or between the cardholder mobile device 102 or cardholder computer system 104 and the transaction pre-registration service server 118. The transaction pre-registration service application 140 stores a user profile associated with the user, for example, in database 14. The user profile includes cardholder contact and financial data for the cardholder 116. Additionally, the user profile may be viewed, accessed, and/or updated by the cardholder mobile device 102 and/or the cardholder computer system 104. The cardholder 116 accesses the transaction pre-registration service application 140 to communicate with the transaction pre-registration service server 118, in particular, to pre-register a large or atypical transaction and/or submit travel intentions of the cardholder to the transaction pre-registration service server 118.

The transaction pre-registration service system 10 further includes the merchant client system 130, which may include a real or virtual point-of-sale (POS) device, an inventory computing device, or any other computing device capable of communicating with the transaction processor 16 and/or with the transaction pre-registration service server 118. In the example embodiment, the merchant client system 130 is associated with a merchant 106 (shown in FIG. 2). The transaction pre-registration service server 118 is configured to access merchant client system 130 through, for example, a cloud-based interface. The transaction pre-registration service server 118 is configured to communicate with merchant client system 130 to access data (e.g., transaction data, merchant location, etc.) and/or to access any virtual merchant capabilities of the merchant (e.g., to order delivery of an item from the merchant). Additionally or alternatively, at least one of the cardholder mobile device 102 and/or the cardholder computer system 104 may access the merchant client system 130 directly to access the virtual merchant capabilities of the merchant 106. Although only one merchant client system 130 is shown in FIG. 1 for clarity, it is understood that the transaction pre-registration service server 118 may be coupled in communication with any number of merchant client systems 130.

In the example embodiment, the transaction pre-registration service server 118 receives transaction pre-registration data from the cardholder 116 via one or more of the cardholder mobile device 102 and/or the cardholder computer system 104. The transaction pre-registration data relates to a cardholder's anticipated future transaction and/or transactions. The transaction pre-registration data is stored by the transaction pre-registration service server 118 in the database 14. In addition, the transaction pre-registration service server 118 receives the cardholder's real-time transaction data from, for example, the interchange network 112. For a given incoming transaction, the transaction pre-registration service server 118 identifies any cardholder input transaction entries for the cardholder's account from the transaction pre-registration data. If there is no transaction pre-registration data stored for the cardholder's account, then no further transaction rating processing is performed by the transaction pre-registration service server 118 and the incoming transaction is processed business-as-usual (BAU) by the interchange network 112. If the cardholder's account has transaction pre-registration data, the transaction pre-registration service server 118 attempts to match in any way the incoming transaction data to the transaction pre-registration data the cardholder 116 set up in advance. Based on the matching process, the transaction pre-registration service server 118 determines a transaction confidence score and transmits the score to the payment card issuer 110 for further decisioning.

FIG. 2 is a simplified block diagram of an exemplary payment card network system 100 including the transaction pre-registration service server 118 in accordance with one embodiment of the present disclosure. The payment card network system 100 may be utilized by consumers and merchants as part of a process of initiating an authorization request and performing a transaction concurrent with delivery of goods or services as described herein via the interchange network 112. In addition, the payment card network system 100 is a transaction card account system including the cardholder mobile device 102 and the cardholder computer system 104, which the cardholder 116 may use to conduct electronic transactions and/or record payments for electronic transactions related to purchase of a merchant's goods or services. It should be understood that the various components shown in FIG. 2 may be a subset of a larger system that could be used, for example, to register or enroll the cardholder 116 in a transaction pre-registration service. It should also be understood that, in some embodiments, cardholders, merchants, issuers, and/or acquirers may participate in the cardholder enrollment or registration process (e.g., via a transaction pre-registration service website or webpage hosted by a transaction pre-registration service server computer system) before transaction pre-registration processing in accordance with embodiments described herein may occur.

The payment card network system 100 enables payment-by-card transactions in which merchants 106, acquirers 108, and/or card issuers 110 do not need to have a one-to-one relationship. Although parts of the payment card network system 100 are presented in one arrangement, other embodiments may include the same or different parts arranged otherwise, depending, for example, on authorization processes for purchase transactions, communication between computing devices, etc.

In the example embodiment, the payment card network system 100 generally includes the cardholder mobile device 102, the cardholder computer system 104, merchants 106, acquirers 108, issuers 110, and the interchange network 112 coupled in communication via a communications network 114. The network 114 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder mobile device 102, the cardholder computer system 104, the merchants 106, the acquirers 108, the issuers 110, and/or the interchange network 112. In some embodiments, the network 114 may include more than one type of network, such as a private payment transaction network provided by the interchange network 112 to the acquirers 108 and the issuers 110 and, separately, the public Internet, which may facilitate communication between the cardholder computer system 104, the interchange network 112, the acquirers 108, and one or more cardholder mobile devices 102, etc.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data includes a unique account number associated with an account holder using a payment card issued by an issuer; purchase data representing a purchase made by the cardholder, including a type of merchant, amount of purchase, date of purchase; and/or other data, which may be transmitted between any parties of the payment card network system 100.

In a typical transaction card system, a financial institution called the "issuer" issues a transaction card, such as a credit card, to a consumer such as the cardholder 116, who uses the transaction card to tender payment for a purchase from the merchant 106. The cardholder 116 may input information from a transaction card into the cardholder mobile device 102 and/or cardholder computer system 104 and store the information as digital wallet data 306 (broadly, payment credentials) (shown in FIG. 3). The merchant 106 is typically associated with products, for example, and without limitation, goods and/or services, that are offered for sale and are sold to the cardholder 116. The merchant 106 includes, for example, a physical location and/or a virtual location such as an Internet-based store-front.

To accept payment from the cardholder 116, for example, with the digital wallet data 306, the merchant 106 must normally establish an account with a financial institution that is part of the payment card network system 100. This financial institution is usually called the "merchant bank," the "acquiring bank," or the acquirer 108. When the cardholder 116 submits payment for a purchase with the cardholder mobile device 102 and/or the cardholder computer system 104 using the digital wallet data 306, the merchant 106 requests authorization from the acquirer 108 for the purchase. The request may be performed over a telephone but is usually performed using a point-of-sale terminal that reads the cardholder's account information from a magnetic stripe, a chip, embossed characters on the transaction card, or digital wallet data and communicates electronically with the transaction processing computers of the acquirer 108. Alternatively, the acquirer 108 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 112, computers of the acquirer 108 or merchant processor will communicate with computers of the issuer 110 to determine whether the cardholder's account is in good standing and whether the purchase is covered by the cardholder's available credit line. Based on these determinations, the request for authorization will be declined or accepted. If the request is accepted, an authorization code is issued to the merchant 106.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 106 to charge, or "capture," a transaction until the purchased goods are shipped or the purchased services are delivered. However, with respect to at least some debit card transactions, a charge may be posted at the time of the transaction. When the merchant 106 delivers the purchased products, the merchant 106 captures the transaction, for example, by appropriate data entry procedures on a point-of-sale terminal. This may include bundling of approved transactions daily for standard retail purchases. If the cardholder 116 cancels a transaction before it is captured, a "void" is generated. If the cardholder 116 returns goods after the transaction has been captured, a "credit" is generated. The interchange network 112 and/or the issuer 110 stores the transaction card information, such as, and without limitation, a type of merchant, a merchant identifier, a location where the transaction was completed, an amount of purchase, and a date and time of the transaction, in a transaction database 134.

After a purchase has been made, a clearing process occurs to transfer additional transaction data related to the purchase among the parties to the transaction, such as the acquirer 108, the issuer 110, and the interchange network 112. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 110, the cardholder's account is decreased. Normally, a charge is posted immediately to the cardholder's account. The interchange network 112 transmits the approval to the acquirer 108 for distribution of goods/services or information, or cash in the case of an automated teller machine (ATM).

After a transaction is authorized and cleared, the transaction is settled among the merchant 106, the acquirer 108, and the issuer 110. Settlement refers to the transfer of financial data or funds among the merchant's account, the acquirer 108, and the issuer 110 related to the transaction. Usually, transactions are captured and accumulated into a "batch," which is settled as a group. More specifically, a transaction is typically settled between the issuer 110 and the interchange network 112, and then between the interchange network 112 and the acquirer 108, and then between the acquirer 108 and the merchant 106. It should be appreciated that more or less information related to transactions, as part of either authorization, clearing, and/or settling, may be included in the transaction data and stored within the transaction database 134, at the merchant 106, the acquirer 108, the payment network 112, and/or the issuer 110. Further, transaction data, unrelated to a particular payment account, may be collected by a variety of techniques, and similarly stored within the transaction database 134.

In some embodiments, cardholders 116 involved in the transactions described herein may be prompted to agree to legal terms associated with their payment accounts, for example, during enrollment in such payment accounts, etc. As such, the cardholder 116 may voluntarily agree to allow the merchants 106, the issuers 110, the interchange network 112, etc., to utilize data collected during enrollment and/or collected relating to processing the transactions, subsequently for one or more of the purposes described herein.

As shown in FIG. 2, the interchange network 112 includes the transaction pre-registration service server 118, which is, for example, and without limitation, a server, a network of multiple computing devices, a virtual computing device, or the like. In addition, in some embodiments, the payment card network system 100 may also include one or more merchant or client sub-systems 130 (also referred to as client systems) coupled in communication to the transaction pre-registration service server 118. The client systems 130 are computers including, for example, a web browser and a memory device, such that the transaction pre-registration service server 118 is accessible to the client systems 130 using, for example, the Internet. The client systems 130 are interconnected to the Internet through one or more interfaces including a network, such as a local area network (LAN) or a wide area network (WAN), dial-in-connections, cable modems, and special high-speed ISDN lines. The client systems 130 can be any device capable of interconnecting to the Internet including, for example, a web-based smartphone, a personal digital assistant (PDA), or any other web-based connectable equipment.

As described above, the payment card network system 100 includes one or more cardholder computer systems 104 that are connected to the transaction pre-registration service server 118, and in some embodiments, may be connected to the client systems 130. The cardholder computer systems 104 are interconnected to the Internet through one or more interfaces including a network, such as a local area network (LAN) or a wide area network (WAN), dial-in-connections, cable modems, wireless modems, and special high-speed ISDN lines. The cardholder computer systems 104 can be any computing device capable of interconnecting to the Internet and including an input device capable of reading or storing information from a user's financial transaction card, including the digital wallet data 306.

Furthermore, as described above, the payment card network system 100 includes at least one cardholder mobile device 102 (e.g., a smartphone or other computing device used by the consumer to complete transactions), which is configured to communicate with the transaction pre-registration service server 118. In one embodiment, the cardholder mobile device 102 is associated with or controlled by a consumer making a purchase using a transaction card account and the payment card network system 100. The cardholder mobile device 102 may be interconnected to the Internet through one or more interfaces including a network, such as a LAN or a WAN, dial-in-connections, cable modems, wireless connections, and special high-speed ISDN lines. The cardholder mobile device 102 can be any computing device capable of interconnecting to the Internet including a mobile web-based device, smartphone, PDA, or other mobile web-based connectable equipment. In the example embodiment, the cardholder mobile device 102 is configured to communicate with the transaction pre-registration service server 118 to transmit, for example, and without limitation, the cardholder's account access credentials and/or transaction pre-registration data to the transaction pre-registration service server 118. The cardholder mobile device 102 is configured to communicate with the transaction pre-registration service server 118 using various outputs including, for example, radio frequency communication, near field communication (NFC), network-based communication, and the like.

The transaction pre-registration service server 118 is connected to the transaction database 134. In one embodiment, the transaction database 134 is stored on the transaction pre-registration service server 118 and can be accessed by users at one of the client systems 130 by logging onto the transaction pre-registration service server 118 through one of the client systems 130. In an alternative embodiment, the transaction database 134 is stored remotely from the transaction pre-registration service server 118 and may be non-centralized. The transaction database 134 may store transaction data generated as part of sales activities conducted over the bankcard network including data relating to merchants, account holders or customers, and purchases. The transaction database 134 may also store account data including at least one of a user name, a user address, an account number, and other account identifiers. The transaction database 134 may also store merchant data including a merchant identifier that identifies each merchant registered to use the payment account card network, and instructions for settling transactions including merchant bank account information. The transaction database 134 may also store primary account numbers (PANs) or bank account numbers for various parties including merchants and customers, along with payment verification identifiers and other data necessary to implement the system and processes described herein.

As described herein, the transaction pre-registration service server 118 is configured to receive from the cardholder 116 various transaction pre-registration data and analyze various data associated with the payment card transactions based, in part, on the transaction pre-registration data. In addition, the transaction pre-registration service server 118 is configured to provide various information, such as a transaction confidence score to one or more parties involved in the payment card transaction, such as the issuer 110. Specifically, the transaction pre-registration service server 118 is a specially programmed computer system that enables the interchange network 112 to implement an automated process for a cardholder to pre-register large or atypical transactions and travel intentions with the interchange network 112, and to score the cardholder's transactions based in part on the pre-registration data to facilitate reducing the number of declines by the issuer, for example, for cardholder's that have opted to take advantage of a transaction pre-registration service.

In the example embodiment, the following associations may be made: one of the client systems 130 may be associated with an acquirer, a user, or a customer; another one of the client systems 130 may be associated with an issuer; the cardholder mobile device 102 and the cardholder computer system 104 may be associated with a consumer; and the transaction pre-registration service server 118 may be associated with a payment network or interchange network. While only one merchant 106, acquirer 108, interchange network 112, and issuer 110 are shown in FIG. 2 (for ease of reference), it should be appreciated that a variety of other embodiments may include multiple ones of these parts in various combinations.

Figure 3:
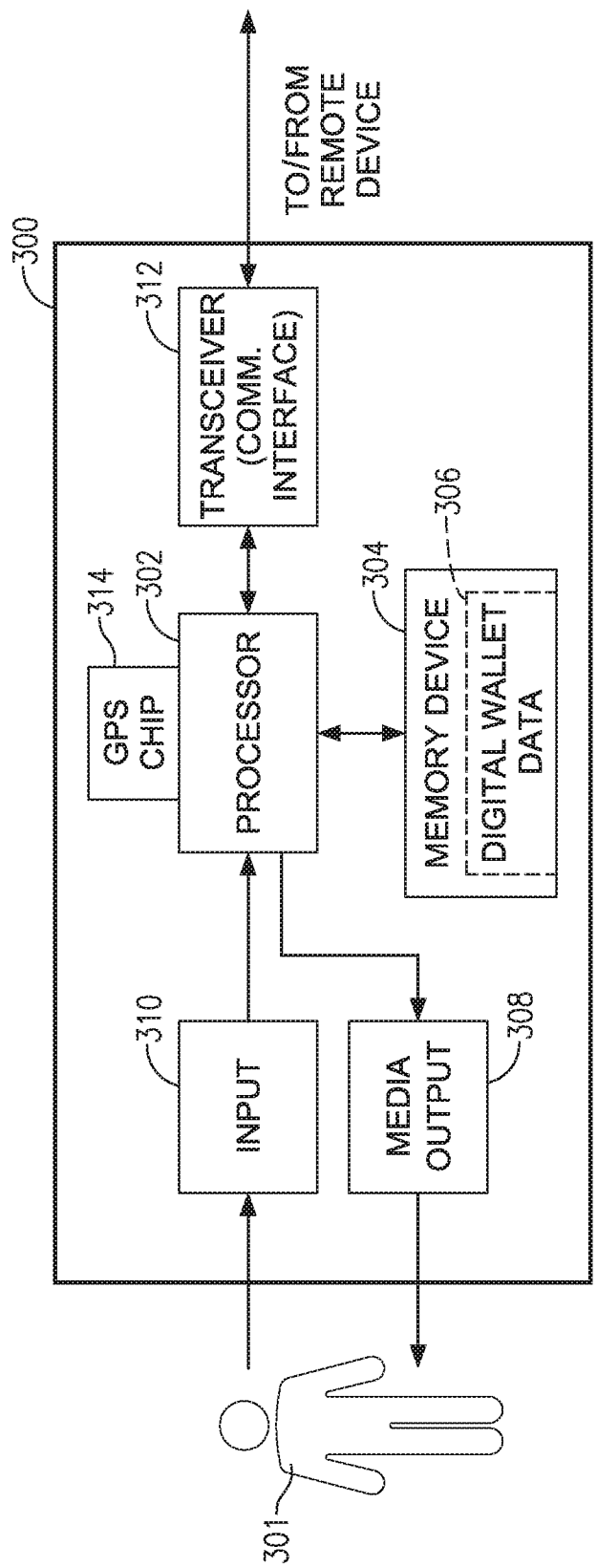
FIG. 3 is an example configuration of a user system for use with the payment card network system shown in FIG. 2.

FIG. 3 is an example configuration of a user system 300 operated by a user 301, such as the cardholder 116 (shown in FIG. 2). In some embodiments, the user system 300 is a cardholder mobile device 102 (shown in FIG. 1), a cardholder computer system 104 (shown in FIG. 1), and/or a client system 130 (shown in FIG. 1).

In the example embodiment, the user system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as the digital wallet data 306 (optional), executable instructions, and/or written works to be stored and retrieved. The memory device 304 includes one or more computer readable media.

In one example embodiment, the processor 302 may be implemented as one or more cryptographic processors. A cryptographic processor may include, for example, dedicated circuitry and hardware such as one or more cryptographic arithmetic logic units (not shown) that are optimized to perform computational intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in one suitable embodiment, a GPS chip 314 can be part of or separate from the processor 302 to enable the location of the user system 300 to be determined.

The user system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In one example embodiment, the media output component 308 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, a cardholder mobile device 102 may detect a person's presence by detecting that the person has touched the integrated display on the cardholder mobile device 102.

In some embodiments, the user system 300 includes an input device 310 for receiving input from the user 301. The input device 310 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 308 and the input device 310, as described above. The user system 300 may also include a transceiver 312 (broadly, a communication interface), which is communicatively connectable to a remote device such as the merchant client system 130 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and/or the transaction pre-registration service application 140 (shown in FIG. 1). Web browsers enable users, such as the cardholder 116, to display and interact with media and other information typically embedded on a web page or a website from transaction pre-registration service server 118. The transaction pre-registration service application 140 allows the cardholder 116 to interact with the transaction pre-registration service server 118 to pre-register transactions and travel intentions of the cardholder 116.

Figure 4:
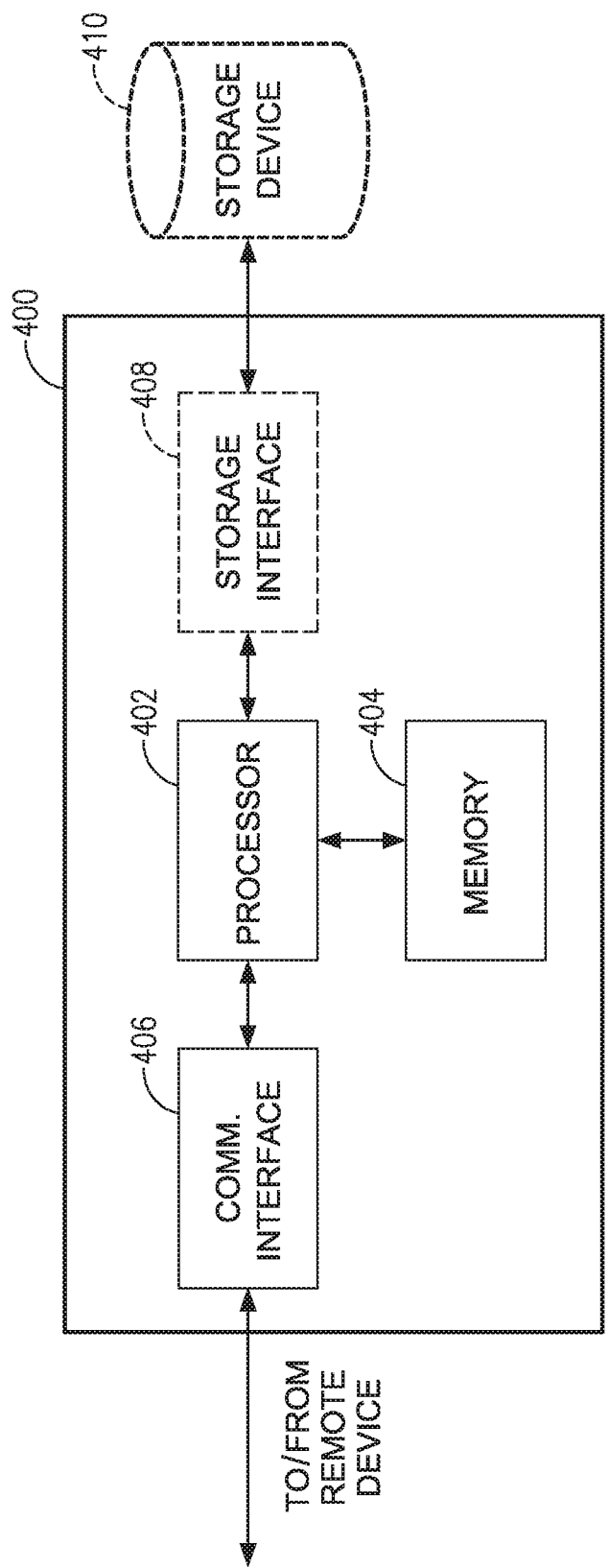
FIG. 4 is an example configuration of a server system for use in the payment card network system shown in FIG. 2.

FIG. 4 is an example configuration of a server system 400, such as the transaction pre-registration service server 118 (shown in FIG. 1). In some embodiments, the server system 400 is substantially like the transaction pre-registration service server 118. In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computational intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 402 is operatively coupled to a communication interface 406 such that the server system 400 can communicate with a remote device such as a user system 300 or another server system 400. For example, the communication interface 406 may receive communications from the cardholder mobile device 102 and/or the cardholder computer system 104 via the Internet, as illustrated in FIG. 1.

The processor 402 is operatively coupled to the storage device 410. The storage device 410 is any computer-operated hardware suitable for storing and/or retrieving data. In some embodiments, the storage device 410 is integrated in the server system 400 and is like the database 14 (shown in FIG. 1). In other embodiments, the storage device 410 is external to the server system 400 and is like the transaction database 134 (shown in FIG. 2). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 5:
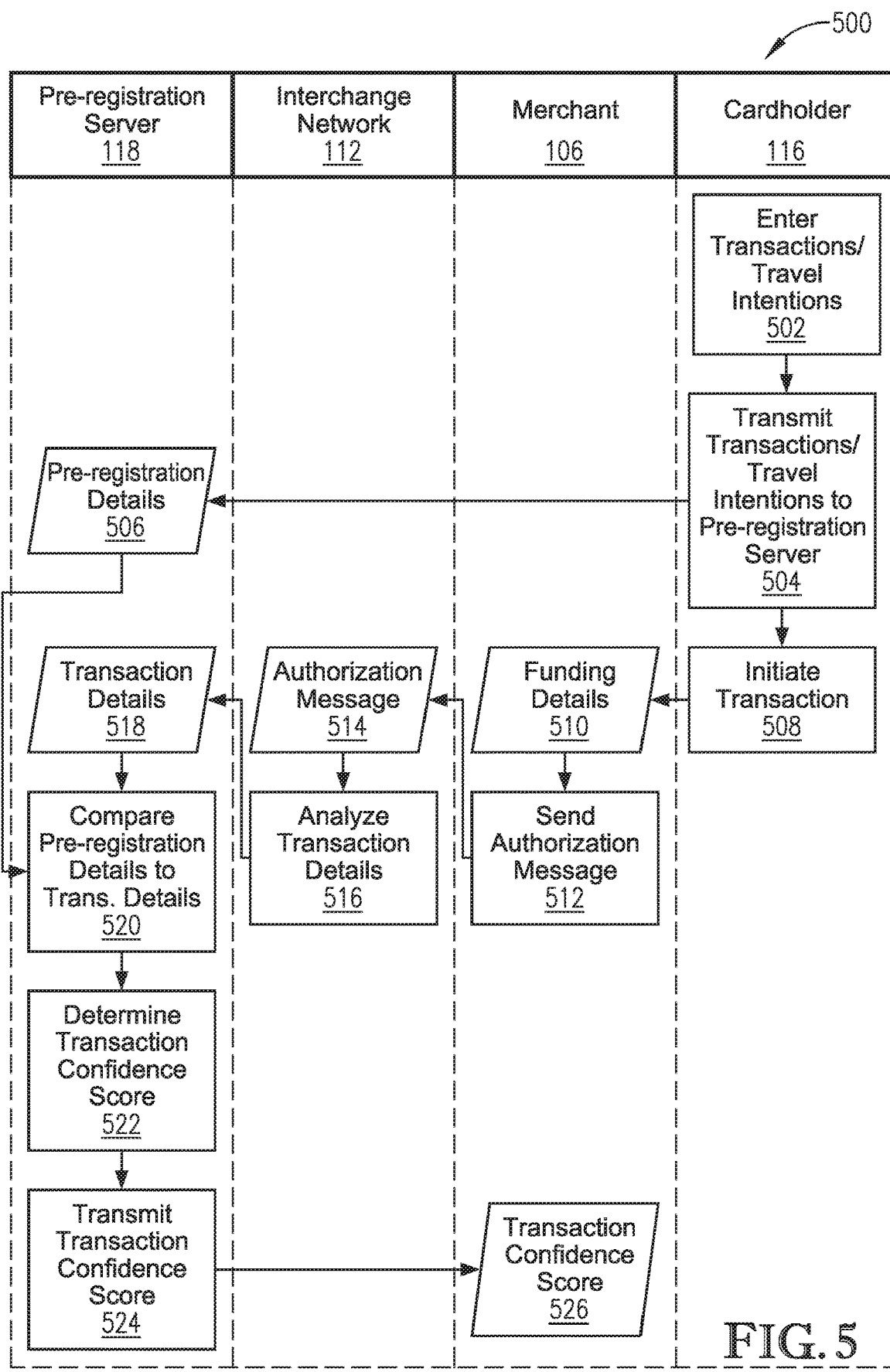
FIG. 5 is a flow diagram illustrating an exemplary transaction confidence scoring flow using the transaction pre-registration service server shown in FIG. 1.

FIG. 5 is a flow diagram illustrating an exemplary transaction confidence scoring flow 500.

Referring now to FIG. 5, an exemplary sequence may include the merchant 106, the interchange network 112, the cardholder 116, and the transaction pre-registration service server 118. At block 502, the cardholder 116 enters transaction pre-registration data and/or the cardholder's travel intentions. For example, and without limitation, the cardholder 116 may enter an approximate transaction amount or an approximate total amount for several transactions at a single merchant. Additionally or alternatively, the cardholder 116 may enter travel pre-registration data, including, for example, a travel destination. At block 504, the cardholder 116 may transmit the transaction pre-registration data and/or the cardholder's travel intentions to the transaction pre-registration service server 118. At block 506, the transaction pre-registration data and/or the cardholder's travel intentions may be stored by the transaction pre-registration service server 118.

At block 508, the cardholder 116 may initiate a transaction at a merchant, such as the merchant 106. For example, and without limitation, the cardholder 116 may transmit funding details, such as the digital wallet data 306 (shown in FIG. 3), to the merchant 106 for the purchase of good and/or services. At block 510, the merchant 106 may store the funding details. At block 512, the merchant 106 may use the funding details to generate and transmit a transaction authorization message to the interchange network 112.

At block 514, the interchange network 112 may store the transaction authorization message. The interchange network may analyze the transaction authorization message at block 516 to determine the transaction details including, for example, and without limitation, the payment account associated with the transaction, the merchant and/or merchant location, and the issuing bank of the associated payment account. The transaction details may be transmitted to the transaction pre-registration service server 118.

At block 518, the transaction pre-registration service server 118 may store the transaction details. At block 520, the transaction pre-registration service server 118 may compare the transaction details extracted from the transaction authorization message to the transaction pre-registration data and/or the cardholder's travel intentions stored by the transaction pre-registration service server 118. Based on the comparison, the transaction pre-registration service server 118 may determine a transaction confidence score at block 522. The transaction confidence score is transmitted to the merchant 106 by the transaction pre-registration service server 118 at block 524. After receiving the transaction confidence score from the transaction pre-registration service server 118, the merchant 106 may store the transaction confidence score at block 526. The transaction confidence score may be assigned a value between 0 and 9, with 0 indicating that there is no transaction pre-registration data corresponding to the transaction, and 9 indicating a maximum confidence value where the transaction details substantially matched all the transaction pre-registration data entered by the cardholder 116.

As is understood from the transaction confidence scoring process, a cardholder may enter anticipated transactions and/or travel intentions with the payment network, and rather than traditional fraud modeling that is reactionary, the payment network may provide a transaction confidence score to an issuer that is proactive, i.e., based on cardholder anticipated transactions. This process may facilitate reducing the number of transaction declines by an issuer for a respective cardholder, where traditional reactionary fraud models may indicate the transaction is likely fraudulent.

Figure 6:
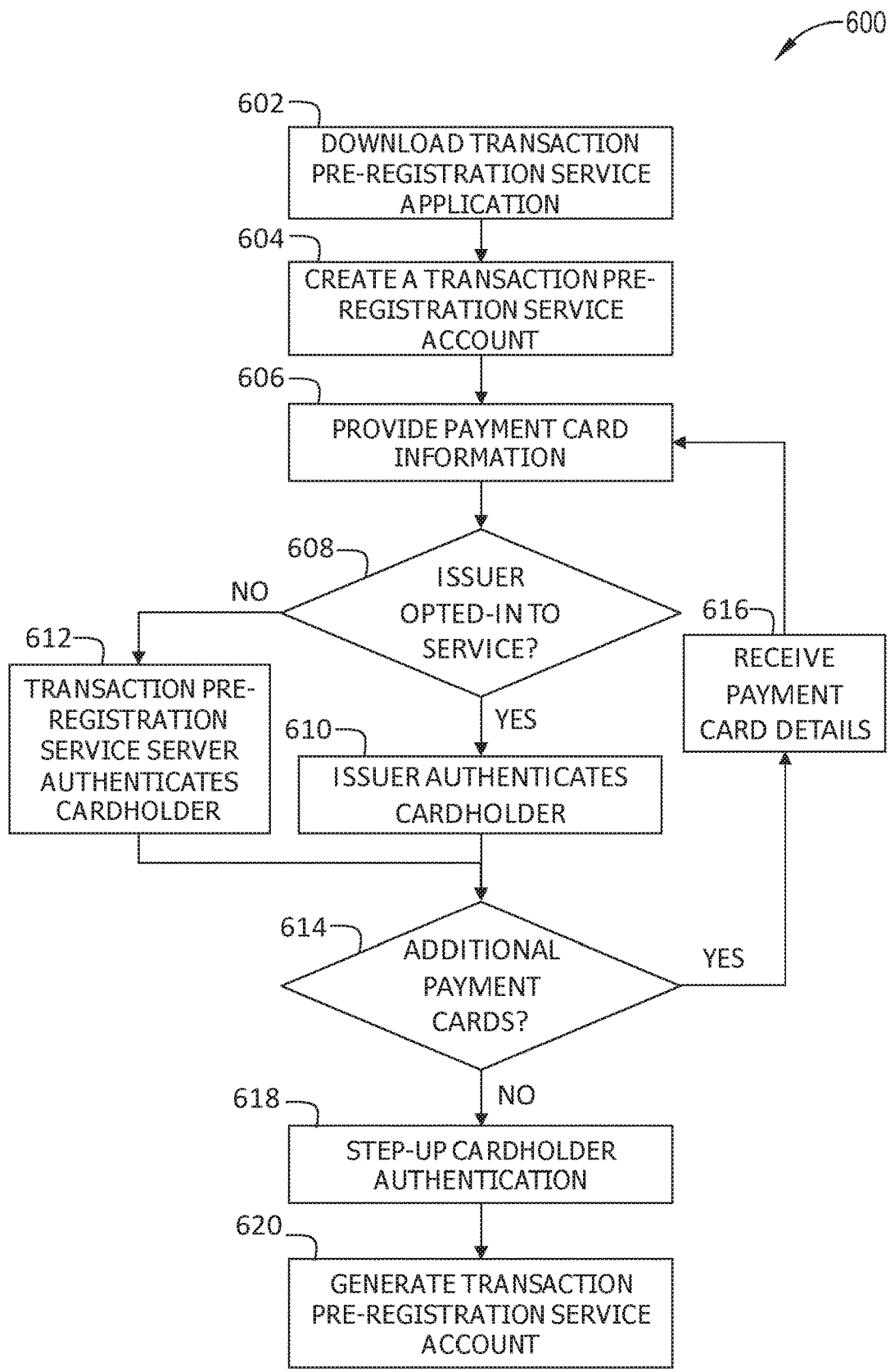
FIG. 6 is a flowchart illustrating an exemplary computer-implemented method for registering a cardholder for a transaction pre-registration service using the transaction pre-registration service server shown in FIG. 1.

FIG. 6 is a flowchart illustrating an exemplary computer-implemented method 600 for registering a cardholder for a transaction pre-registration service, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional.

The computer-implemented method 600 is described below, for ease of reference, as being executed by exemplary devices and components introduced with the embodiments illustrated in FIGS. 1-5. In one embodiment, the method 600 may be implemented by the payment card network system 100 (shown in FIG. 1). In the exemplary embodiment, the method 600 relates to the receiving of cardholder registration information from the cardholder mobile device 102 (shown in FIG. 1) upon registration for the transaction pre-registration service. While operations within the method 600 are described below regarding the cardholder mobile device 102, the method 600 may be implemented on the cardholder computer system 104 as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, in the example embodiment, the cardholder 116 downloads the transaction pre-registration service application 140 (shown in FIG. 1). For example, the cardholder 116 may connect to the transaction pre-registration service server 118, which may instruct the cardholder 116 to download the transaction pre-registration service application 140 to the cardholder mobile device 102 for direct communication with the transaction pre-registration service server 118 via the interchange network 112, e.g., without use of a web browser. When the cardholder 116 uses the transaction pre-registration service application 140, a direct link is established via a wireless connection, for example, via a Wi-Fi connection to the network 114.

Referring to operation 602, the cardholder 116 downloads the transaction pre-registration service application 140. The cardholder mobile device 102, such as a web-based smartphone, is configured to execute for display the transaction pre-registration service application 140. In some embodiments, the transaction pre-registration service application 140 may be stored in a cloud-based interface, which may include cloud storage capability as well as any cloud-based API that facilitates communication between the cardholder mobile device 102 and transaction pre-registration service server 118. The transaction pre-registration service application 140 facilitates transmitting and receiving data between the cardholder mobile device 102 and transaction pre-registration service server 118 for enrolling the cardholder and pre-registering anticipated transactions.

At operation 604, the cardholder 116 is presented an option to create a transaction pre-registration service account. For example, the cardholder 116 enrolls for the transaction pre-registration service via the transaction pre-registration service application 140 or via a suitable webpage of the transaction pre-registration service server 118 using, for example, the cardholder computer system 104. It should be understood that the cardholder 116 may enroll or register with the transaction pre-registration service in any of several ways, including utilizing the cardholder computer system 104 to access the transaction pre-registration service server 118 via the Internet and providing required information. During cardholder enrollment, the cardholder 116 may provide enrollment data including basic information about himself or herself (e.g., name, address, phone number, etc.) and, in some embodiments, provide information regarding the customer's mobile devices (for example, by providing a SIM identifier and/or a mobile telephone number and/or other device identifier). In addition, the cardholder 116 may provide information and/or preferences concerning one or more family members, such as a spouse and/or children to form a "Household" transaction pre-registration service account. It is noted that the transaction pre-registration service account can be linked to other Mastercard services if the cardholder 116 is already signed up for other unrelated services. In some embodiments, the information obtained from the cardholder 116 during the enrollment process includes product and/or service preferences, and/or other information.

At operation 606, the cardholder 116 may also provide information concerning his or her payment card, e.g., bank credit card account, debit card account, loyalty card account, and/or gift card issued to or held by him or her. At operation 608, the transaction pre-registration service server 118 determines whether the issuer 110 of the payment card has opted-in to the transaction pre-registration service. If the issuer 110 chooses to opt-in to the transaction pre-registration service, at operation 610 the issuer 110 authenticates the cardholder 116 in real-time. For example, and without limitation, the issuer 110 may authenticate the cardholder 116 via a one-time code sent to the cardholder 116 via Short Message Service (SMS), e-mail, through an issuer mobile application, through a call center communication, and the like. In the exemplary embodiment, issuer authentication is the preferred method for authenticating the cardholder 116, as the issuer 110 and the cardholder 116 have a direct relationship.

If the issuer 110 is not opted-in to the transaction pre-registration service and therefore, does not participate in the enrollment process, at operation 612, the transaction pre-registration service server 118 authenticates the cardholder 116. For example, and without limitation, the cardholder 116 may be asked to input a string of characters indicating a code printed on the signature panel of the cardholder's payment card. For example, the signature panel code may be a card verification code (CVC) value. The values entered by the cardholder 116 may be used by the transaction pre-registration service server 118 to authenticate the cardholder 116 prior to setting up the transaction pre-registration service account and associating the cardholder 116 and the cardholder's payment card with the account. For example, the transaction pre-registration service server 118 compares the entered values to the values associated with the payment card stored in a database (e.g., the database 134 shown in FIG. 1). If the entered values match the stored values, the cardholder 116 is authenticated. While this method allows the cardholder to be authenticated, it may not be as strong of an authentication or verification that the issuer 110 could provide. As such, subsequent transactions input by the cardholder 116 in the transaction pre-registration service may not be afforded the highest rating level.

Optionally, the method 600 may include an additional operation for authenticating the cardholder 116 offline. This may facilitate increasing the rating level of the cardholder's transactions input into the transaction pre-registration service if the issuer 110 is not opted-in to the service. For example, and without limitation, the transaction pre-registration service server 118 may provide an offline PIN to the cardholder 116 via mail.

At operation 614, the transaction pre-registration service server 118 asks the cardholder 116 whether the cardholder has additional payment cards he or she wishes to associate with the cardholder's transaction pre-registration service account. If the cardholder has additional payment cards to enter, at operation 616, the transaction pre-registration service server 118 receives the payment card details from the cardholder 116 and returns to operation 606. If the cardholder does not have any additional payment cards to enter, the method continues to operation 618.

At operation 618, the transaction pre-registration service server 118 requests that the cardholder 116 set up a step-up authentication method, i.e., two-factor authentication. The additional authentication measures may be taken before the transactions may be entered into the transaction pre-registration service by the cardholder 116. For example, and without limitation, in one embodiment, the cardholder 116 is requested to establish account access credentials, e.g., to select a username and password or PIN (personal identification number) to be used for security purposes, and/or for use by the cardholder 116 to login and change one or more preference and/or requirement settings, for example. In addition to the password or PIN, the cardholder is requested to set up a second authentication factor, including, for example, and without limitation, providing a biometric sample that is to be associated with the other registration information provided.

Biometric samples include, without limitation, a fingerprint image, a voice recording, a retinal image, facial recognition, palm print image, iris recognition, and the like. The biometric sample is unique to the cardholder 116 and difficult to duplicate and/or forge by an unauthorized user. The biometric sample is stored and associated with a biometric identifier, for example, by the transaction pre-registration service server 118 (e.g., in the database 134, etc.). Additionally, the biometric identifier is associated with the stored registration information and facilitates secure authorization of transactions input by the cardholder 116. A biometric input device in communication with the cardholder mobile device 102 may be used for the cardholder 116 to enter the biometric sample. For example, the cardholder mobile device 102 may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code in sent to the cardholder's mobile device via SMS), Time-Based One Time Password (TOTP) authentication (where an authenticator application provides a short code as a second factor), push-based two-factor authentication (where a prompt is sent to the cardholder's mobile device), or any other two-factor authentication method that enables the method 600 to operate as described herein.

At operation 620, the transaction pre-registration service server 118 generates the transaction pre-registration service account for the cardholder 116, associating the cardholder's one or more payment cards with the account along with the cardholder's account access credentials.

Figure 7:
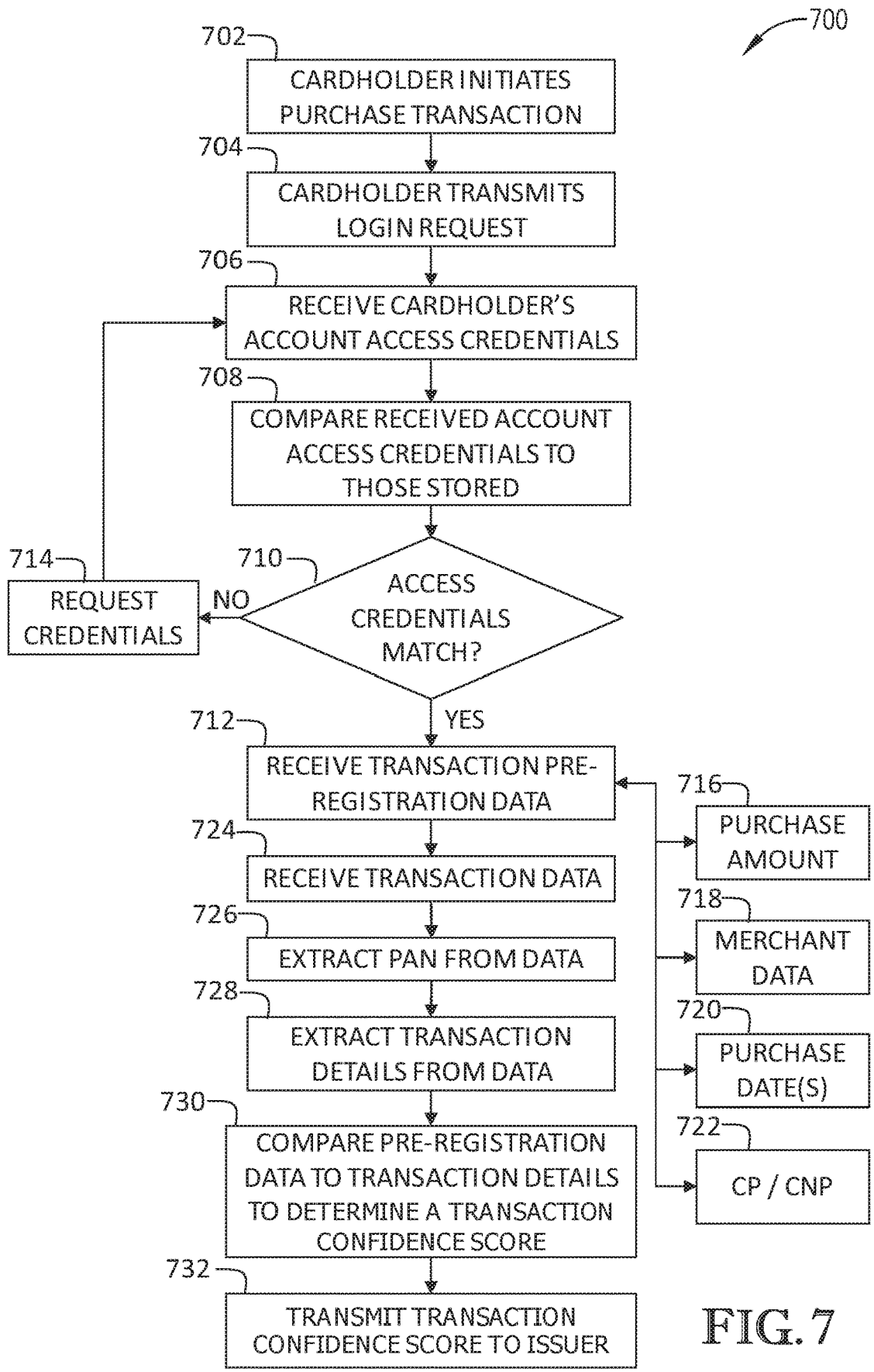
FIG. 7 is a flowchart illustrating a computer-implemented method for scoring a transaction using a transaction pre-registration service using the transaction pre-registration service server shown in FIG. 1.

FIG. 7 is a flowchart illustrating a computer-implemented method 700 for scoring a transaction using a transaction pre-registration service, in accordance with one embodiment of the present disclosure. The operations described herein may be performed in the order shown in FIG. 7 or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-5. In one embodiment, the method 700 may be implemented by the payment card network system 100 (shown in FIG. 1). In the exemplary embodiment, the method 700 relates to the operations of receiving transaction pre-registration data from the cardholder 116 (shown in FIG. 1) and corresponding transaction data from the interchange network 112 (shown in FIG. 1). While operations within the method 700 are described below regarding the cardholder mobile device 102, the method 700 may be implemented on the cardholder computer system 104 as well as other such devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, in the example embodiment, the cardholder 116 decides that he or she wishes to initiate a purchase transaction or a plurality of purchase transactions. For example, and without limitation, the cardholder 116 may decide to initiate a large and/or atypical purchase transaction, which the cardholder 116 is concerned could be unauthorized by the cardholder's payment card issuer 110, or the cardholder 116 may wish to initiate several transactions in a short period. For example, in one embodiment, the cardholder 116 may wish to initiate a purchase for a television at a local merchant 106. The television may have a price of about $2,000.00, which is a large and/or atypical purchase for the cardholder 116 based on the cardholder's transaction history. In another embodiment, the cardholder 116 may wish to initiate several transactions at one location, such as buying fuel for several vehicles during a single stop at a fuel supply merchant.

At operation 704, the cardholder 116 transmits a request to log into his or her transaction pre-registration service account. For example, in one embodiment, the cardholder 116 may use the cardholder mobile device 102 to establish a connection to the transaction pre-registration service server 118 to login to the transaction pre-registration service account while the cardholder is shopping for the television. Alternatively, the cardholder 116 may use the cardholder computer system 104 to establish a connection to the transaction pre-registration service server 118 to login to the transaction pre-registration service account, for example, when the cardholder is at home and shopping online.

At operation 706, the transaction pre-registration service server 118 receives from the cardholder 116 the cardholder's account access credentials. At operation 708, the transaction pre-registration service server 118 compares the received cardholder's account access credentials to those stored by the transaction pre-registration service server 118 during the transaction pre-registration service account setup.

At operation 710, if the cardholder's account access credentials match, the method continues at operation 712. However, if the cardholder's account access credentials do not match, the transaction pre-registration service server 118 may request that the cardholder 116 again provide the cardholder's account access credentials at operation 714 or may end the login attempt.

At operation 712, transaction pre-registration data may be received by the transaction pre-registration service server 118. For example, and without limitation, the transaction pre-registration service server 118 may present a transaction data input wizard to the cardholder 116 for inputting the transaction pre-registration data. Moreover, the transaction pre-registration service server 118 may store the transaction pre-registration data in memory, such as memory 404 (shown in FIG. 4) or the storage device 410 (shown in FIG. 4). The transaction pre-registration data may correspond to a payment card associated with the cardholder's transaction pre-registration service account.

At operation 716, the transaction pre-registration service server 118 may receive from the cardholder 116, for example, an approximate transaction amount or an approximate total amount for several transactions at a single merchant. In one suitable embodiment, the transaction pre-registration service server 118 may generalize the approximate transaction amount and may account for sales tax and potential price differences (e.g., price increases or last-minute discounts).

At operation 718, the transaction pre-registration service server 118 may receive from the cardholder 116 merchant data, such as a name of the merchant 106 and/or a merchant category code (e.g., fuel, vending machine, and the like). In one suitable embodiment, the transaction pre-registration service server 118 may present to the cardholder 116, via a web browser or the transaction pre-registration service application 140, a pre-filled merchant name list to facilitate avoiding typographical errors and the like.

At operation 720, the transaction pre-registration service server 118 may receive from the cardholder 116 a date or a date range when the proposed transaction or transactions may occur. For example, and without limitation, the cardholder 116 may input the date corresponding to the date the entry is made, a date for a future transaction, and range of dates, and the like. In one suitable embodiment, the transaction pre-registration service server 118 may limit the date or date range to a predetermined number of days (e.g., no more than two days before the proposed transaction). At operation 722, the transaction pre-registration service server 118 may receive from the cardholder 116 a transaction type, e.g., whether the proposed transaction will be made at a store (i.e., a card present transaction) or online (i.e., a card-not-present transaction).

It is noted that the transaction pre-registration data submitted by the cardholder 116 may include more or less data than described herein. The more transaction pre-registration data entered by the cardholder 116, the higher a transaction confidence score may be, as determined by the transaction pre-registration service server 118. In addition, it is noted that the transaction pre-registration data may be changed, deleted, and/or added to at any time using, for example, the transaction pre-registration service application 140 or the cardholder computer system 104 via a web browser.

At operation 724, the transaction pre-registration service server 118 receives cardholder transaction data from the interchange network 112. The cardholder transaction data may correspond to a payment card associated with the cardholder's transaction pre-registration service account. For example, and without limitation, the cardholder transaction data may include a payment authorization request message (e.g., a message type indicator (MTI) 0100 message) for authorization for a cardholder purchase. The MTI 0100 authorization message may be formatted as a preauthorization request and may include a primary account number (PAN) corresponding to the payment account of the cardholder 116 and an amount of the transaction.

In the exemplary embodiment, at operation 726, the transaction pre-registration service server 118 may extract the PAN from the MTI 0100 authorization message. Specifically, the transaction pre-registration service server 118 may extract a copy of the PAN from the MTI 0100 authorization message and temporarily store it in memory, such as memory 404 (shown in FIG. 4). The transaction pre-registration service server 118 may then match the PAN to the payment card associated with the cardholder's transaction pre-registration service account.

At operation 728, the transaction pre-registration service server 118 may extract the transaction details from the MTI 0100 authorization message, including, for example, the transaction amount, the transaction date, the merchant, the type of transaction (e.g., whether a card present or card-not-present transaction), and the like and compare them to the transaction pre-registration data entered by the cardholder 116.

Based on the comparison of the transaction details to the transaction pre-registration data, at operation 730, the transaction pre-registration service server 118 may determine a transaction confidence score for the transaction. In one suitable embodiment, the transaction confidence score may be assigned a value between 0 and 9, with 0 indicating that there is no transaction pre-registration data corresponding to the transaction, and 9 indicating a maximum confidence value where the transaction details substantially matched all the transaction pre-registration data entered by the cardholder 116.

At operation 732, the transaction pre-registration service server 118 may transmit the transaction confidence score for the transaction to the issuer 110. For example, and without limitation, in one suitable embodiment, the transaction confidence score may be embedded or appended to the MTI 0100 authorization message as a new data element and/or encoded within an existing data element. It is noted that the issuer 110 may choose to do something with the transaction confidence score or not as the issuer 110 ultimately determines whether to approve or decline the transaction. However, the issuer 110 will always receive the transaction confidence score from the transaction pre-registration service server 118 for each payment card or payment account that is opted-in to the transaction pre-registration service.

Figure 8:
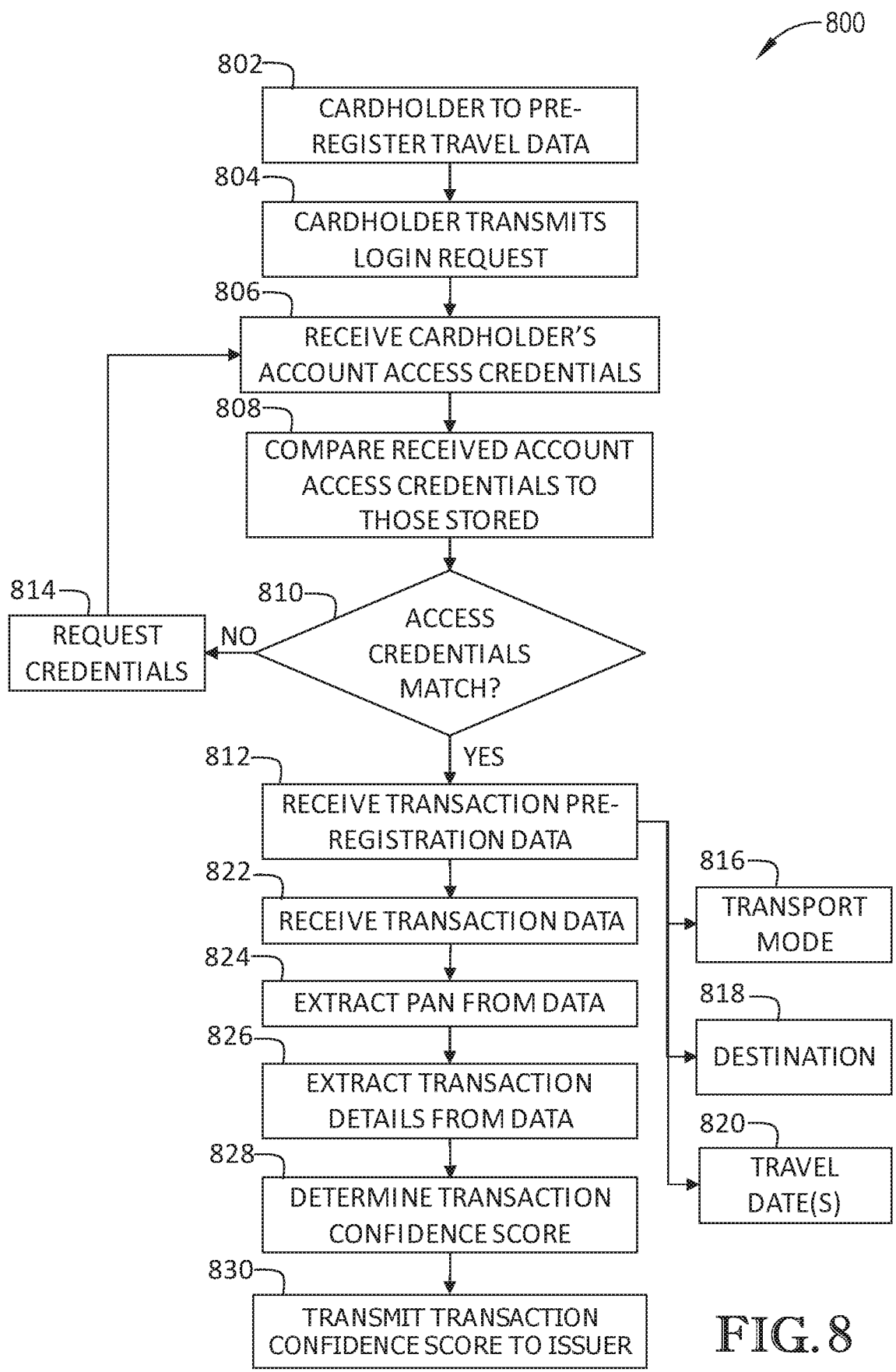
FIG. 8 is a flowchart illustrating another computer-implemented method for scoring a transaction using a transaction pre-registration service using the transaction pre-registration service server shown in FIG. 1.

FIG. 8 is a flowchart illustrating another computer-implemented method 800 for scoring a transaction using a transaction pre-registration service, in accordance with another embodiment of the present disclosure. The operations described herein may be performed in the order shown in FIG. 8 or may be performed in a different order. Furthermore, some operations may be performed concurrently as opposed to sequentially. In addition, some operations may be optional.

The computer-implemented method 800 is described below, for ease of reference, as being executed by exemplary devices and components introduced with the embodiments illustrated in FIGS. 1-5. In one embodiment, the method 800 may be implemented by the payment card network system 100 (shown in FIG. 1). In the exemplary embodiment, the method 800 relates to the operations of receiving transaction pre-registration data from the cardholder 116 (shown in FIG. 1) and corresponding transaction data from the interchange network 112 (shown in FIG. 1). While operations within the method 800 are described below regarding the cardholder mobile device 102, the method 800 may be implemented on the cardholder computer system 104 as well as other such devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 802, in the example embodiment, the cardholder 116 decides that he or she wishes to pre-register his or her travel intentions. For example, and without limitation, the cardholder 116 may decide to travel to a location distant from his or her home area and the cardholder 116 may be concerned that transactions made during his or her travel could be unauthorized by the cardholder's payment card issuer 110. For example, in one embodiment, the cardholder 116 may wish to travel by car to Florida when the cardholder's home is located in Missouri. As such, transactions made along the travel route, which may be atypical for the cardholder 116 based on the cardholder's transaction history, may be declined by the issuer 110.

At operation 804, the cardholder 116 transmits a request to log into his or her transaction pre-registration service account. For example, in one embodiment, the cardholder 116 may use the cardholder mobile device 102 to establish a connection to the transaction pre-registration service server 118 to login to the transaction pre-registration service account while the cardholder is travelling. Alternatively, the cardholder 116 may use the cardholder computer system 104 to establish a connection to the transaction pre-registration service server 118 to login to the transaction pre-registration service account, for example, when the cardholder is at home and preparing for future travel.

At operation 806, the transaction pre-registration service server 118 receives from the cardholder 116 the cardholder's account access credentials. At operation 808, the transaction pre-registration service server 118 compares the received cardholder's account access credentials to those stored by the transaction pre-registration service server 118 during the transaction pre-registration service account setup.

At operation 810, if the cardholder's account access credentials match, the method continues at operation 812. However, if the cardholder's account access credentials do not match, the transaction pre-registration service server 118 may request that the cardholder 116 again provide the cardholder's account access credentials at operation 814 or may end the login attempt.

At operation 812, travel pre-registration data may be received by the transaction pre-registration service server 118. For example, and without limitation, the transaction pre-registration service server 118 may present a travel data input wizard to the cardholder 116 for inputting the travel pre-registration data.

At operation 816, the transaction pre-registration service server 118 may receive from the cardholder 116, for example, a transportation mode that may be used by the cardholder 116 for his or her travel intentions. For example, and without limitation, the cardholder 116 may indicate that the cardholder 116 plans to travel by car, rail, air, sea, etc. The transaction pre-registration service server 118 may be programmed to pre-fill certain transaction categories based on the cardholder's selected mode of transportation. For example, if the cardholder 116 selects that the mode of transportation is by car, the transaction pre-registration service server 118 may automatically include merchant categories such as fuel, restaurant, etc. along the route between the cardholder's home and destination. In embodiments, where the cardholder 116 selects air as the mode of transportation, the transaction pre-registration service server 118 may automatically include merchant categories such as airports, vending machines, etc. located in the cardholder's departure and arrival airports.

At operation 818, the transaction pre-registration service server 118 may receive from the cardholder 116 a travel destination location, such as a city, state, or country. In one suitable embodiment, the transaction pre-registration service server 118 may present to the cardholder 116, via a web browser or the transaction pre-registration service application 140, a pre-filled destination location list to facilitate avoiding typographical errors and the like. In addition, in some suitable embodiments, the transaction pre-registration service server 118 may present to the cardholder 116 popular travel destinations (e.g., Walt Disney World®) that may be selected with options for dates of travel and a maximum amount to be spent per transaction at the location and/or a total amount to be spent during the travel dates.

At operation 820, the transaction pre-registration service server 118 may receive from the cardholder 116 a date or a date range for the proposed travel. For example, and without limitation, the cardholder 116 may input the date corresponding to the date the cardholder plans to leave and plans to return. In one suitable embodiment, the transaction pre-registration service server 118 may limit the date or date range to a predetermined number of days and/or a limit on the number of days before the proposed travel.

It is noted that the travel pre-registration data submitted by the cardholder 116 may include more or less data than described herein. The more travel pre-registration data entered by the cardholder 116, the higher a transaction confidence score may be, as determined by the transaction pre-registration service server 118. In addition, it is noted that the travel pre-registration data may be changed, deleted, and/or added to at any time using, for example, the transaction pre-registration service application 140 or the cardholder computer system 104 via a web browser.

At operation 822, the transaction pre-registration service server 118 receives cardholder transaction data from the interchange network 112. The cardholder transaction data may correspond to a payment card associated with the cardholder's transaction pre-registration service account. For example, and without limitation, the cardholder transaction data may include a payment authorization request message (e.g., a message type indicator (MTI) 0100 message) for authorization for a cardholder purchase. The MTI 0100 authorization message may be formatted as a preauthorization request and may include a primary account number (PAN) corresponding to the payment account of the cardholder 116 and an amount of the transaction.

In the exemplary embodiment, at operation 824, the transaction pre-registration service server 118 may extract the PAN from the MTI 0100 authorization message. Specifically, the transaction pre-registration service server 118 may extract a copy of the PAN from the MTI 0100 authorization message and temporarily store it in memory, such as memory 304 (shown in FIG. 3). The transaction pre-registration service server 118 may then match the PAN to the payment card associated with the cardholder's transaction pre-registration service account.

At operation 826, the transaction pre-registration service server 118 may extract the transaction details from the MTI 0100 authorization message, including, for example, the transaction amount, the transaction date, the merchant, the merchant location, the merchant type, and the like and compare them to the travel pre-registration data entered by the cardholder 116.

Based on the comparison of the transaction details to the travel pre-registration data, at operation 828, the transaction pre-registration service server 118 may determine a transaction confidence score for the transaction. In one suitable embodiment, the transaction confidence score may be assigned a value between 0 and 9, with 0 indicating that there is no transaction pre-registration data corresponding to the transaction, and 9 indicating a maximum confidence value where the transaction details substantially matched all the travel pre-registration data entered by the cardholder 116.

At operation 830, the transaction pre-registration service server 118 may transmit the transaction confidence score for the transaction to the issuer 110. For example, and without limitation, in one suitable embodiment, the transaction confidence score may be embedded or appended to the MTI 0100 authorization message as a new data element and/or encoded within an existing data element. It is noted that the issuer 110 may choose to do something with the transaction confidence score or not as the issuer 110 ultimately determines whether to approve or decline the transaction. However, the issuer 110 will always receive the transaction confidence score from the transaction pre-registration service server 118 for each payment card or payment account that is opted-in to the transaction pre-registration service.

Figure 9:
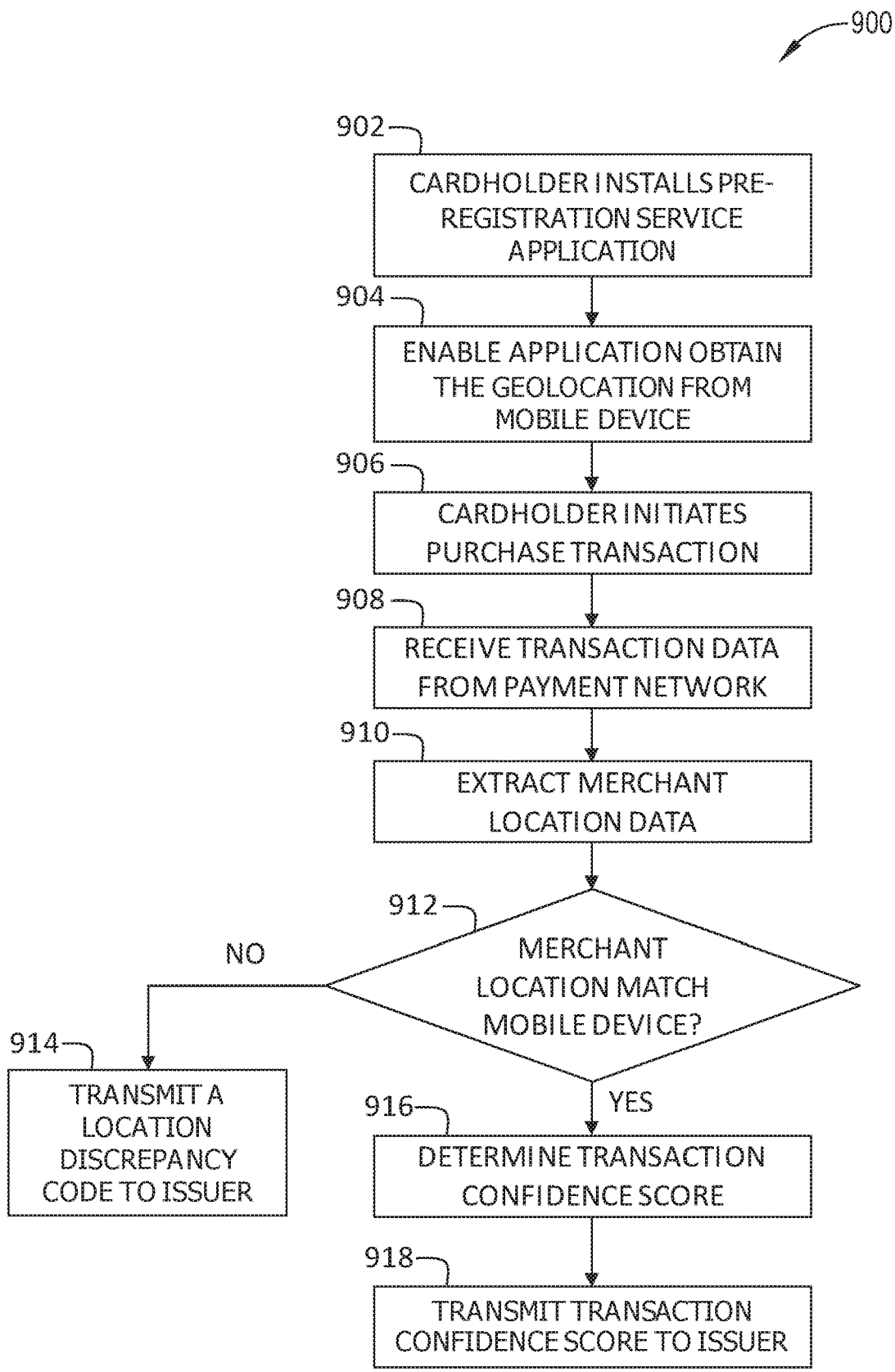
FIG. 9 is a flowchart illustrating a computer-implemented method for scoring a transaction based on geolocation using a transaction pre-registration service using the transaction pre-registration service server shown in FIG. 1.

FIG. 9 is a flowchart illustrating a computer-implemented method 900 for scoring a transaction based on geolocation using a transaction pre-registration service, in accordance with one embodiment of the present disclosure. The computer-implemented method 900 may be used in combination with the computer-implemented methods 700 and 800 described herein. For example, the location data described below may be part of the purchase or travel pre-registration data described above with respect to the computer-implemented methods 700 and 800, respectively.

The operations of the computer-implemented method 900 may be performed in the order shown in FIG. 9 or may be performed in a different order. Furthermore, some operations may be performed concurrently as opposed to sequentially. In addition, some operations may be optional.

The computer-implemented method 900 is described below, for ease of reference, as being executed by exemplary devices and components introduced with the embodiments illustrated in FIGS. 1-5. In one embodiment, the method 900 may be implemented by the payment card network system 100 (shown in FIG. 1). In the exemplary embodiment, the method 900 relates to the operations of receiving geolocation data from the cardholder 116 (shown in FIG. 1) and transaction data from the interchange network 112 (shown in FIG. 1). While operations within the method 900 are described below regarding the cardholder mobile device 102, the method 900 may be at least partially implemented on the transaction pre-registration service server 118, the interchange network 112, as well as other such devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s)

may instruct the processor or processing units to perform additional, fewer, or alternative actions, including those discussed elsewhere herein.

At operation 902, in the example embodiment, the cardholder 116 installs the transaction pre-registration service application 140 onto the cardholder mobile device 102. At operation 904, the cardholder 116 enables the transaction pre-registration service application 140 to obtain the geolocation of the cardholder mobile device 102. For example, and without limitation, the cardholder 116 sets a setting of the transaction pre-registration service application 140 to enable the transaction pre-registration service application 140 to passively obtain the GPS coordinates (i.e., location data) of the cardholder mobile device 102 in the background. This facilitates the transaction pre-registration service application 140 to make a direct correlation between every point-of-sale purchase or transaction of the cardholder 116 and the contemporaneous location of the cardholder's cardholder mobile device 102. A geo-temporal history of a payment card cardholder's point-of-sale purchases or transactions is tracked to compare geolocation information for the cardholder mobile device 102 operated by a mobile network provider to contemporaneous mobile device location in order to match the cardholder 116 to his or her payment card accounts. A unique identification number can be assigned by the network provider in lieu of providing the matching cardholder mobile device 102 number to the payment card issuer in order to maintain privacy. The identity of the cardholder 116 can then be securely verified by the merchant 106 in future purchases by querying the mobile network operator for the location of the cardholder's mobile device number (corresponding to the Identification Number) at the time of the purchase.

At operation 906, the cardholder 116 initiates a purchase transaction using the payment card associated with the cardholder's transaction pre-registration service account. At operation 908, the transaction pre-registration service server 118 receives transaction data from the interchange network 112 corresponding to the purchase transaction. As described herein, the transaction data may correspond to a payment card associated with the cardholder's transaction pre-registration service account. For example, and without limitation, the transaction data may include a payment authorization request message (e.g., a message type indicator (MTI) 0100 message) for authorization for a cardholder purchase. The MTI 0100 authorization message may be formatted as a preauthorization request and may include a primary account number (PAN) corresponding to the payment account of the cardholder 116 and an amount of the transaction.

In the exemplary embodiment, at operation 910, the transaction pre-registration service server 118 may extract merchant location data for the merchant 106 from the MTI 0100 authorization message. Specifically, the transaction pre-registration service server 118 may extract a copy of the merchant location data from the MTI 0100 authorization message and temporarily store it in memory, such as memory 304 (shown in FIG. 3). At operation 912, the transaction pre-registration service server 118 may then determine whether the merchant location data received in the MTI 0100 authorization message matches the location data of the cardholder mobile device 102, for example, within a predetermined distance.

At operation 914, if the merchant location data and the location data received from the cardholder mobile device 102 are not within the predetermined distance, the transaction pre-registration service server 118 may transmit a location discrepancy code for the transaction to the issuer 110 indicating conflicting geographic information. For example, and without limitation, in one suitable embodiment, the location discrepancy code may be a specific code transmitted as part of a transaction confidence score embedded or appended to the MTI 0100 authorization message as a new data element and/or encoded within an existing data element. It is noted that the issuer 110 may choose to do something with the location discrepancy code or not as the issuer 110 ultimately determines whether to approve or decline the transaction. However, the issuer 110 will always receive the location discrepancy code from the transaction pre-registration service server 118 for each payment card or payment account that is opted-in to the geolocation feature of the transaction pre-registration service.

At operation 916, if the merchant location data and the location data received from the cardholder mobile device 102 are within the predetermined distance, the transaction pre-registration service server 118 may determine a transaction confidence score for the transaction. In one suitable embodiment, the transaction confidence score may be assigned a value between 0 and 9, as described herein.

At operation 918, the transaction pre-registration service server 118 may transmit the transaction confidence score for the transaction to the issuer 110. For example, and without limitation, in one suitable embodiment, the transaction confidence score may be embedded or appended to the MTI 0100 authorization message as a new data element and/or encoded within an existing data element. It is noted that the issuer 110 may choose to do something with the transaction confidence score or not as the issuer 110 ultimately determines whether to approve or decline the transaction. However, the issuer 110 will always receive the transaction confidence score from the transaction pre-registration service server 118 for each payment card or payment account that is opted-in to the transaction pre-registration service.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, Wi-Fi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

Having thus described one or more embodiments of the invention, what is claimed as new and desired to be protected by Letters Patent includes the following:

What is claimed is:

1. A computer-implemented method performed by a server, said server comprising a processor programmed to perform the operations of:
    receiving, in advance of a future transaction, pre-registration data associated with a cardholder, the pre-registration data corresponding to the future transaction, the pre-registration data including one or more of the following: a transaction amount, a merchant name, a merchant category code, a date, and a transaction type;
    receiving cardholder transaction data from an interchange network, the transaction data corresponding to a transaction associated with the cardholder;
    extracting transaction details from the received cardholder transaction data;
    comparing the extracted transaction details to the received pre-registration data;
    receiving, from a global positioning system chip of a cardholder mobile device associated with the cardholder, geolocation data corresponding to a geolocation of the cardholder mobile device at a time of the transaction;
    extracting merchant location data from the cardholder transaction data;
    comparing the extracted merchant location data to the received geolocation data;
    based on the comparisons, determining a transaction confidence score for the transaction;
    inserting the transaction confidence score into a payment authorization request message;
    transmitting the payment authorization request message with the transaction confidence score to an issuer server for authorization of the transaction,
    wherein the pre-registration data includes a transaction amount,
    wherein receiving the transaction amount comprises receiving one or more of the following: an approximate transaction amount and an approximate total amount for a plurality of transactions performed at a single merchant.

2. The computer-implemented method in accordance with claim 1, further comprising:
    storing the received pre-registration data in a data storage device.

3. The computer-implemented method in accordance with claim 1, further comprising:
    transmitting the transaction confidence score to an issuer of a payment card associated with the transaction.

4. The computer-implemented method in accordance with claim 1, wherein receiving the pre-registration data comprises:
    receiving transaction pre-registration data associated with a selected payment card of the cardholder.

5. The computer-implemented method in accordance with claim 4, wherein receiving the cardholder transaction data from the interchange network comprises:
    receiving cardholder transaction data associated with the selected payment card of the cardholder.

6. The computer-implemented method in accordance with claim 4, wherein receiving the cardholder transaction data from the interchange network comprises:
   receiving a payment authorization request message for authorization of the transaction.

7. The computer-implemented method in accordance with claim 6, wherein the payment authorization request message comprises a primary account number.

8. The computer-implemented method in accordance with claim 7, wherein extracting the transaction details from the received cardholder transaction data comprises:
   extracting a copy of the primary account number; and
   temporarily storing the extracted copy of the primary account number in a memory device.

9. The computer-implemented method in accordance with claim 8, further comprising:
   matching the extracted copy of the primary account number to the selected payment card of the cardholder.

10. The computer-implemented method in accordance with claim 1,
    wherein the pre-registration data includes a merchant name,
    wherein receiving the merchant name comprises:
       presenting to the cardholder a pre-filled merchant name list to input the merchant name; and
       receiving a selection from the cardholder of a merchant name selected from the pre-filled merchant name list.

11. The computer-implemented method in accordance with claim 1,
    wherein the pre-registration data includes a transaction type,
    wherein receiving the transaction type comprises receiving one or more of the following:
       a card present transaction and a card-not-present transaction.

12. The computer-implemented method in accordance with claim 1, wherein receiving the pre-registration data comprises receiving travel pre-registration data corresponding to travel intentions of the cardholder, the travel pre-registration data including one or more of the following: a transportation mode, a travel destination location, and a date of travel.

13. The computer-implemented method in accordance with claim 1, further comprising generating a transaction pre-registration service account for the cardholder, comprising:
    presenting to the cardholder an option to create a transaction pre-registration service account;
    receiving from the cardholder enrollment data including a primary account number associated with a payment account of the cardholder and account access credentials;
    storing the account access credentials; and
    authenticating the cardholder.

14. The computer-implemented method in accordance with claim 13, further comprising receiving a request to log into the transaction pre-registration service account.

15. The computer-implemented method in accordance with claim 13, further comprising:
    receiving account access credentials for the transaction pre-registration service account; and
    comparing the received account access credentials to the stored account access credentials.

16. The computer-implemented method in accordance with claim 1, wherein receiving the pre-registration data comprises:
    presenting a data input wizard to the cardholder for inputting the pre-registration data.

17. The computer-implemented method performed by a server, said server comprising a processor programmed to perform the operations of:
    receiving, in advance of a future transaction, pre-registration data associated with a cardholder, the pre-registration data corresponding to the future transaction, the pre-registration data including one or more of the following: a transaction amount, a merchant name, a merchant category code, a date, and a transaction type;
    receiving cardholder transaction data from an interchange network, the transaction data corresponding to a transaction associated with the cardholder;
    extracting transaction details from the received cardholder transaction data;
    comparing the extracted transaction details to the received pre-registration data;
    receiving, from a global positioning system chip of a cardholder mobile device associated with the cardholder, geolocation data corresponding to a geolocation of the cardholder mobile device at a time of the transaction;
    extracting merchant location data from the cardholder transaction data;
    comparing the extracted merchant location data to the received geolocation data;
    based on the comparisons, determining a transaction confidence score for the transaction;
    inserting the transaction confidence score into a payment authorization request message;
    transmitting the payment authorization request message with the transaction confidence score to an issuer server for authorization of the transaction,
    wherein the pre-registration data includes a date,
    wherein receiving the date comprises receiving one or more of the following: a date corresponding to the date the transaction pre-registration data is received, a date for a future transaction, and a range defined between two dates.

18. The computer-implemented method in accordance with claim 17, wherein the date for a future transaction and the date range defined between two dates is limited to a predetermined number of days from the date the transaction pre-registration data is received.

19. The computer-implemented method in accordance with claim 17, further comprising:
    generating a transaction pre-registration service account for the cardholder, comprising:
       presenting to the cardholder an option to create a transaction pre-registration service account;
       receiving from the cardholder enrollment data including a primary account number associated with a payment account of the cardholder and account access credentials;
       storing the account access credentials; and
       authenticating the cardholder.

20. The computer-implemented method in accordance with claim 19, further comprising:
    receiving a request to log into the transaction pre-registration service account;
    receiving account access credentials for the transaction pre-registration service account; and comparing the received account access credentials to the stored account access credentials.

\* \* \* \* \*